United States Patent
Gao et al.

(10) Patent No.: US 11,386,691 B2
(45) Date of Patent: Jul. 12, 2022

(54) OPTICAL DEVICE, MODULE, APPARATUS, AND SYSTEM FOR FINGERPRINT IDENTIFICATION

(71) Applicant: BOE Technology Group Co., Ltd., Beijing (CN)

(72) Inventors: Jian Gao, Beijing (CN); Xiaochuan Chen, Beijing (CN); Wei Wang, Beijing (CN); Hongli Yue, Beijing (CN); Wenji Zhu, Beijing (CN); Xiandong Meng, Beijing (CN); Xianqin Meng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 260 days.

(21) Appl. No.: 16/605,983

(22) PCT Filed: Feb. 13, 2019

(86) PCT No.: PCT/CN2019/074909
§ 371 (c)(1),
(2) Date: Oct. 17, 2019

(87) PCT Pub. No.: WO2019/218733
PCT Pub. Date: Nov. 21, 2019

(65) Prior Publication Data
US 2021/0286963 A1    Sep. 16, 2021

(30) Foreign Application Priority Data
May 14, 2018  (CN) .......................... 201810456015.7

(51) Int. Cl.
*G06V 40/13*  (2022.01)
*G02B 3/00*   (2006.01)

(52) U.S. Cl.
CPC ....... *G06V 40/1318* (2022.01); *G02B 3/0062* (2013.01); *G06V 40/1324* (2022.01)

(58) Field of Classification Search
CPC .................................................... G06K 9/0004
See application file for complete search history.

(56) References Cited

U.S. PATENT DOCUMENTS 6,643,390 B1 * 11/2003 Clark ................. G06K 9/00046
356/71
2010/0008552 A1   1/2010  Shin et al.
(Continued)

FOREIGN PATENT DOCUMENTS

| CN | 105550664 A | 5/2016 |
| CN | 105868742 A | 8/2016 |

(Continued)

OTHER PUBLICATIONS

"First Office Action and English language translation", Chinese Patent Application No. 201810456015.7, dated Jun. 1, 2021, 21 pp.

*Primary Examiner* — Joseph R Haley
(74) *Attorney, Agent, or Firm* — Myers Bigel, P.A.

(57) ABSTRACT

The present disclosure provides an optical device, a module, an apparatus and a system for fingerprint identification. The optical device includes: a first lens array including a plurality of first lenses; a second lens array opposite to the first lens array, including a plurality of second lenses; and a light shielding element between the first lens array and the second lens array, the light shielding element including a plurality of light-transmitting apertures. Image focal planes of the plurality of second lenses, object focal planes of the plurality of first lenses, and the light shielding element are coplanar. The plurality of first lenses are in one-to-one correspondence with the plurality of second lenses and the plurality of light-transmitting apertures, respectively.

17 Claims, 7 Drawing Sheets

(56) References Cited

U.S. PATENT DOCUMENTS

| | | |
|---|---|---|
| 2018/0276444 A1 | 9/2018 | Sun et al. |
| 2019/0026530 A1* | 1/2019 | Wu et al. |
| 2019/0049631 A1* | 2/2019 | Lin .................. G02B 5/005 |
| 2020/0210671 A1* | 7/2020 | Ling .................. G02B 27/30 |

FOREIGN PATENT DOCUMENTS

| | | |
|---|---|---|
| CN | 106022324 A | 10/2016 |
| CN | 106778663 A | 5/2017 |
| CN | 106815554 A | 6/2017 |
| CN | 106847872 A | 6/2017 |
| CN | 107358216 A | 11/2017 |
| CN | 207148485 U | 3/2018 |
| CN | 108681703 A | 10/2018 |

* cited by examiner

OPTICAL DEVICE, MODULE, APPARATUS, AND SYSTEM FOR FINGERPRINT IDENTIFICATION

CROSS REFERENCE TO RELATED APPLICATION APPLICATIONS

The present application is a 35 U.S.C. 371 national stage application of the PCT international Application No. PCT/CN2019/074909 filed on Feb. 13, 2019, which claims the benefit of Chinese Patent Application No. 201810456015.7 filed on May 14, 2018, the entire disclosure of which is disclosures of which are incorporated herein by reference.

TECHNICAL FIELD

The present disclosure relates to the field of identification technologies, in particular to an optical device, a module, an apparatus, a system for fingerprint identification, and a method for fabricating the optical device.

BACKGROUND

The optical fingerprint identification technology of OLED displays is still not mature, and the current "under-screen fingerprint" technology still needs to be improved. With the development of full screen technology, the demand for under-screen fingerprint technology is getting larger and the requirements are getting stricter.

SUMMARY

A first aspect of the present disclosure provides an optical device for fingerprint identification, the optical device includes: a first lens array including a plurality of first lenses; a second lens array opposite to the first lens array, including a plurality of second lenses; and a light shielding element between the first lens array and the second lens array, the light shielding element including a plurality of light-transmitting apertures. Image focal planes of the plurality of second lenses, object focal planes of the plurality of first lenses, and the light shielding element are coplanar. The plurality of first lenses are in one-to-one correspondence with the plurality of second lenses and the plurality of light-transmitting apertures, respectively.

In an optional embodiment, the plurality of first lenses and the plurality of second lenses comprise convex lenses.

In an optional embodiment, each first lens or each second lens includes M annular phase gratings, M is a natural number; each phase grating includes N steps, and a height of a step is:

$$h = \frac{\lambda/N}{n_1 - n_2},$$

wherein $\lambda$ is a wavelength of incident light, $n_1$ is a refractive index of a material of the step, $n_2$ is a refractive index of a dielectric on a side of the step away from the light shielding element, and N is an even number.

In another optional embodiment, radii of annulus corresponding to the steps of each phase grating are $r_{j,1}$ and $r_{j,2}$, respectively, wherein $$r_{j,1} = \left[\left(f' + \frac{(2j-1)\lambda/2}{n_1}\right)^2 - f'^2\right]^{1/2} = \sqrt{\frac{(2j-1)f'\lambda}{n_1}}\left(1 - \frac{(2j-1)\lambda}{4n_1 f'}\right)^{1/2},$$

$$r_{j,2} = \left[\left(f' + \frac{j\lambda}{n_1}\right)^2 - f'^2\right]^{1/2} = \sqrt{\frac{2jf'\lambda}{n_1}}\left(1 - \frac{j\lambda}{2n_1 f'}\right)^{1/2},$$

wherein f' represents a focal length value of the first lens array or the second lens array, and j represents a serial number of the phase grating.

In yet another optional embodiment, a center of each first lens, a center of a corresponding second lens, and a center of a corresponding light-transmitting aperture are coaxial.

In still another optional embodiment, a shape of each second lens comprises a square or a regular hexagon; a shape of each first lens comprises a circle or a square, and an aperture of the first lens is smaller than an aperture of the second lens.

In still another optional embodiment, the optical device further includes a first substrate, a second substrate, and an OCA optical adhesive layer; the first lens array is integrally formed with the first substrate; the second lens array is integrally formed with the second substrate; and the light shielding element and the OCA optical adhesive layer are between the first substrate and the second substrate.

A second aspect of the present disclosure provides a module for fingerprint identification, the module includes: an optical device of any one of the above embodiments; and an photosensitive element array on a side of the first lens array away from the light shielding element; the photosensitive element array including a plurality of photosensitive elements; the plurality of photosensitive elements and the plurality of first lenses being in one-to-one correspondence.

In an optional embodiment, the module further includes: a transparent layer between the first lens array and the photosensitive element array.

A third aspect of the present disclosure provides a module for fingerprint identification, the module includes: an optical device of any one of the above embodiments; and a light source having a light emitting direction that is the same as a direction of the first lens array to the second lens array.

In an optional embodiment, the light source comprises an OLED panel; the OLED panel is on a side of the second lens array away from the light shielding element.

In another optional embodiment, the OLED panel and the optical device are attached in a frame-to frame or face-to-face manner.

A fourth aspect of the present disclosure provides an apparatus for fingerprint identification, the apparatus includes: an optical device of any one of the above embodiments; a light source having a light emitting direction that is the same as a direction of the first lens array to the second lens array; and a photosensitive element array on a side of the first lens array away from the light shielding element; the photosensitive element array including a plurality of photosensitive elements; the plurality of photosensitive elements and the plurality of first lenses being in one-to-one correspondence.

In an optional embodiment, the light source comprises an OLED panel, and the OLED panel is on a side of the second lens array away from the light shielding element.

A fifth aspect of the present disclosure provides a fingerprint identification system including the apparatus for fingerprint identification as described above.

A sixth aspect of the present disclosure provides a method for fabricating an optical device, the method includes: providing a first lens array, the first lens array including a plurality of first lenses; providing a second lens array opposite to the first lens array, the second lens array including a plurality of second lenses; and disposing a light shielding element between the first lens array and the second lens array, the light shielding element including a plurality of light-transmitting apertures. Image focal planes of the plurality of second lenses, object focal planes of the plurality of first lenses, and the light shielding element are coplanar; and the plurality of first lenses are in one-to-one correspondence with the plurality of second lenses and the plurality of light-transmitting apertures, respectively.

In an optional embodiment, the plurality of first lenses and the plurality of second lenses comprise convex lenses.

In an optional embodiment, each first lens or each second lens includes M annular phase gratings, M is a natural number; each phase grating includes N steps, and a height of a step is:

$$h = \frac{\lambda/N}{n_1 - n_2},$$

wherein $\lambda$ is a wavelength of incident light, $n_1$ is a refractive index of a material of the step, $n_2$ is a refractive index of a dielectric on a side of the step away from the light shielding element, and N is an even number.

In an optional embodiment, radii of annulus corresponding to the steps of each phase grating are $r_{j,1}$ and $r_{j,2}$, respectively, wherein $$r_{j,1} = \left[\left(f' + \frac{(2j-1)\lambda/2}{n_1}\right)^2 - f'^2\right]^{1/2} = \sqrt{\frac{(2j-1)f'\lambda}{n_1}}\left(1 - \frac{(2j-1)\lambda}{4n_1 f'}\right)^{1/2},$$

$$r_{j,2} = \left[\left(f' + \frac{j\lambda}{n_1}\right)^2 - f'^2\right]^{1/2} = \sqrt{\frac{2jf'\lambda}{n_1}}\left(1 - \frac{j\lambda}{2n_1 f'}\right)^{1/2},$$

wherein f' represents a focal length value of the first lens array or the second lens array, and j represents a serial number of the phase grating.

In an optional embodiment, the step of disposing a light shielding element between the first lens array and the second lens array includes: disposing the light shielding element between a first substrate and a second substrate, and bonding the first substrate and the second substrate using an OCA optical adhesive layer.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

Figure 1:
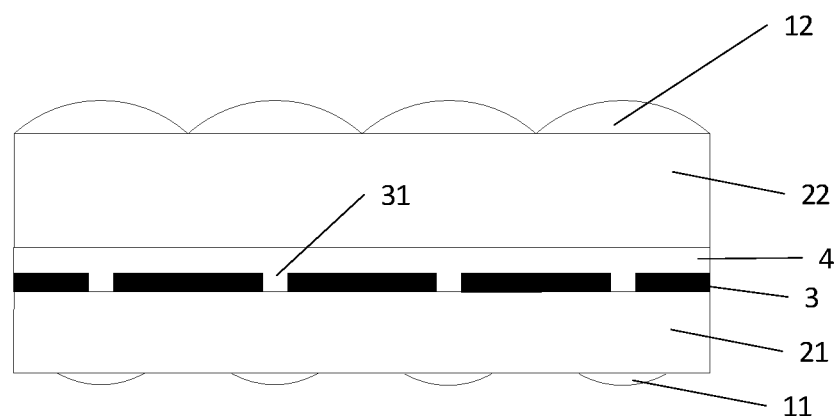
FIG. 1 is a schematic structural view of an optical device according to an embodiment of the present disclosure.

In the following, the technical solutions in the embodiments of the disclosure will be described clearly and completely in connection with the drawings in the embodiments of the disclosure. Obviously, the described embodiments are only part of the embodiments of the disclosure, and not all of the embodiments. Based on the embodiments of the disclosure, all other embodiments obtained by those of ordinary skills in the art under the premise of not paying out creative work pertain to the protection scope of the disclosure.

Various cross-sectional views according to embodiments of the present disclosure are shown in the drawings. The figures are not drawn to scale, and some details are exaggerated for clarity of illustration and some details may be omitted. The shapes of various regions, layers, and the relative size and positional relationship therebetween shown in the figures are merely exemplary and may vary in practice due to manufacturing tolerances or technical limitations. Those skilled in the art can additionally design regions/layers having different shapes, sizes, and relative positions according to actual needs.

The existing optical principle-based identification technology generally includes fingerprint identification, facial identification, and iris identification, etc. According to actual needs, the identification panel can be disposed in an electronic device such as a mobile phone, a television, a computer, or an encryption component such as an access control or an electronic lock.

In addition, the current "under-screen fingerprint" technology still needs to be improved. With the development of full screen technology, the demand for under-screen fingerprint technology is getting larger and the requirements are getting stricter.

The existing under-screen fingerprint identification uses optical fingerprint identification, and light emitted by a light source is reflected by a finger to photosensitive sensors. Since the reflection angles of the valley line and the ridge line of the finger are different, the light intensities received by the photosensitive sensors are different, and thus the electrical signals output are different, and the fingerprint information of the finger can be detected. However, in this solution, the requirement for finger pressing is strict, that is, the finger must be pressed in the specific area. When the pressing angles are inconsistent, the positions of the valley line and the ridge line change, resulting in an inability to identify or identification errors, and the identification efficiency is low. In addition, when the finger is at a certain distance from the specific area, the collected light intensity information has a large difference from the preset value, and cannot be used normally, so the use scenarios of optical fingerprint identification are limited. At present, most of the fingerprint identification devices employ prisms to split light, resulting in bulky volume. Furthermore, since the optical focus of the lens is constant, the position of the sensor is not adjustable. When the sensor is out of focus, the acquired image is blurred, the intensity is low, and the fingerprint information cannot be recognized.

In view of this, embodiments of the present disclosure improve upon existing fingerprint identification.

Figure 2:
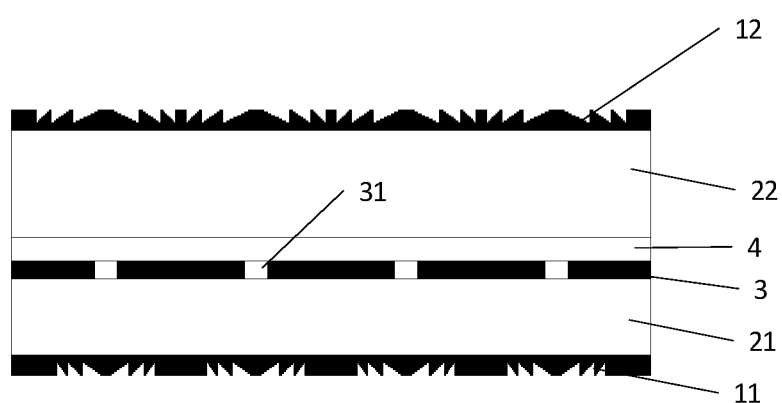
FIG. 2 is a schematic structural view of an optical device according to another embodiment of the present disclosure.

Embodiments of the first aspect of the disclosure provide an optical device for fingerprint identification. As shown in FIG. 1 and FIG. 2, the optical device includes: a first lens array 11 including a plurality of first lenses; a second lens array 12 opposite to the first lens array 11, including a plurality of second lenses, and a light shielding element 3 between the first lens array 11 and the second lens array 12, the light shielding element 3 includes a plurality of light-transmitting apertures 31; image focal planes of the plurality of second lenses, object focal planes of the plurality of first lenses and the light shielding element 3 are coplanar; and the plurality of first lenses are in one-to-one correspondence with the plurality of second lenses and the plurality of light-transmitting apertures, respectively.

In the context of the present disclosure, "image focal planes of the plurality of second lenses, object focal planes of the plurality of first lenses, and the light shielding element are coplanar" means that the extension planes of the image focal planes of the plurality of second lenses, the object focal planes of the plurality of first lenses, and the light shielding element are substantially coincident.

With the above optical device, the light reflected by the fingerprint is received by the photosensitive element after sequentially through the second lens array 12, the plurality of light-transmitting apertures, and the first lens array 11.

In the optical device provided by the embodiments of the present disclosure, the first lens array and the second lens array are combined and fixed to form a double lens structure, which improves integration and reduces the volume of the device. The light shielding element is on a plane where the focuses of the first lens array and the second lens array are located such that incident light and exit light are parallel to the primary optical axis. The object distance and image distance of the optical device can be adjusted without affecting the accuracy thereof, thereby improving the applicability of the optical device.

Further, as shown in FIG. 1, in some optional embodiments, the plurality of first lenses and the plurality of second lenses are convex lenses.

Specifically, as shown in FIG. 1, the surfaces of the first lens array and the second lens array away from the light shielding element have convex structures.

Figure 5:
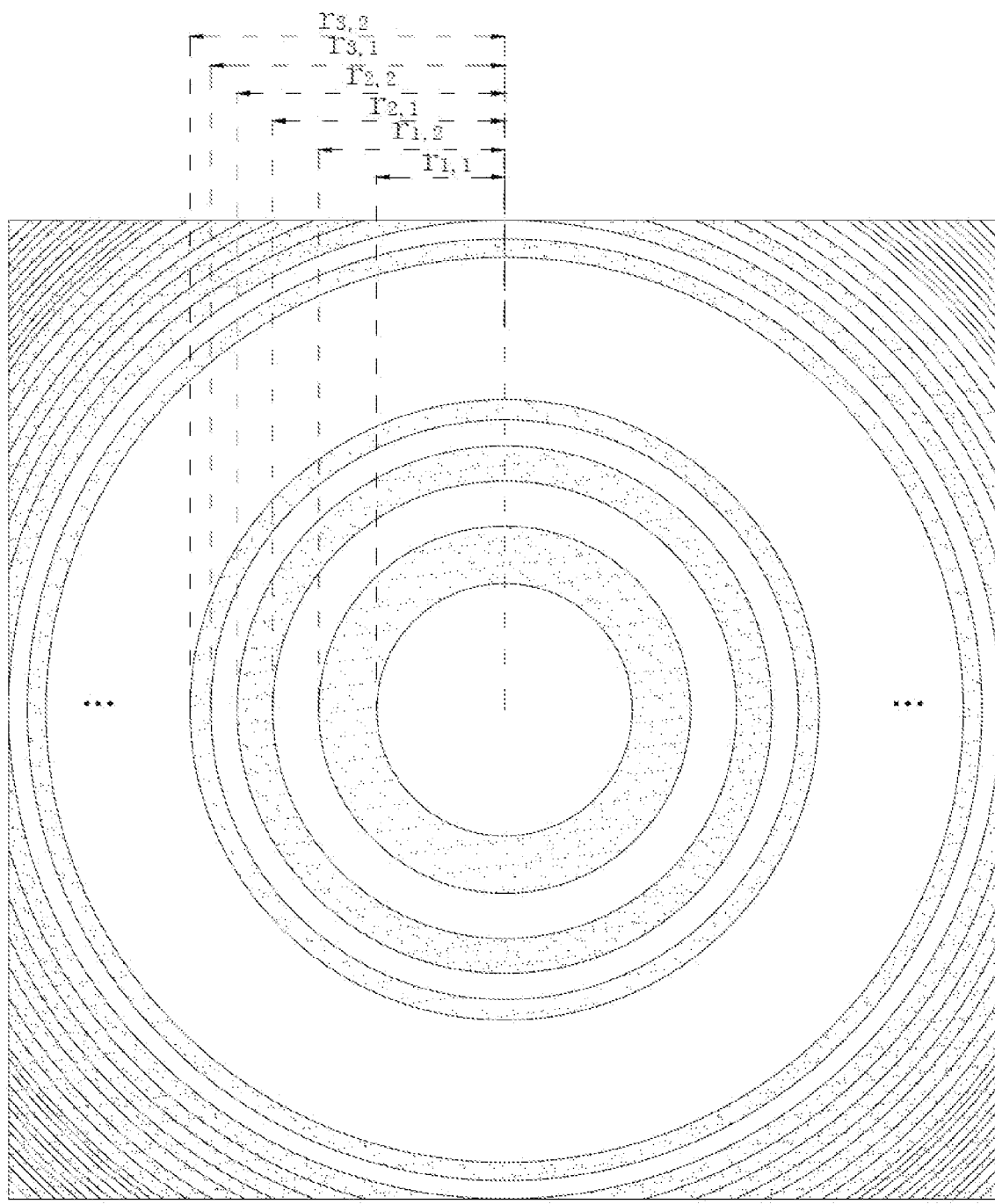
FIG. 5 is a schematic structural view of a lens array being a diffractive lens according to an embodiment of the present disclosure.
Figure 6:
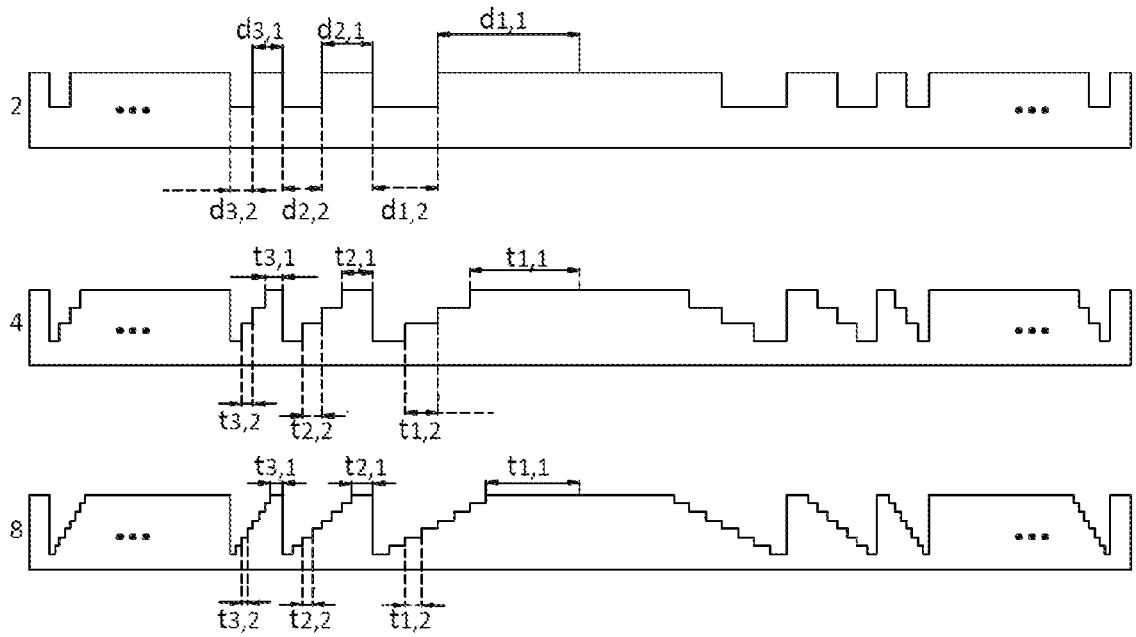
FIG. 6 is a schematic structural view of phase gratings when the lens array is a diffractive lens array according to several embodiments of the present disclosure.

As shown in FIG. 2, FIG. 5 and FIG. 6, in an optional embodiment, the first lens or the second lens includes M annular phase gratings, M is a natural number; and each phase grating includes N steps, a height of a step is:

$$h = \frac{\lambda/N}{n_1 - n_2},$$

where $\lambda$ is a wavelength of incident light, $n_1$ is a refractive index of a material of the step, $n_2$ is a refractive index of a dielectric on a side of the step away from the light shielding element, and N is an even number.

In order to make the optical device thinner to adapt to more scenes and improve applicability, as shown in FIG. 2, the surfaces of the first lens and the second lens away from the light shielding element are recessed to form a plurality of phase gratings, each phase grating includes a plurality of steps. As shown in FIG. 5 and FIG. 6, the diffractive lens includes first to M-th phase gratings, and M is a positive integer. Each phase grating includes N=2m (m=1, 2, 3 . . . ) steps (such as two steps, four steps and eight steps in FIG. 6), and the phase difference of adjacent steps is 2π/N, the height of the step is:

$$h = \frac{\lambda/N}{n_1 - n_2},$$

where $\lambda$ is a wavelength of incident light, $n_1$ is the refractive index of a lens where the step is located, $n_2$ is the refractive index of a dielectric at the surface of a lens where the step is located, N is an even number, and M is a natural number.

Different number of steps has different diffraction efficiency. Specifically, as shown in FIG. 6, three kinds of steps are shown, which are two-steps lens, four-steps lens and eight-steps lens. The more the number of steps in each phase grating, the higher the diffraction efficiency is, but as the number of steps increases, the diffraction efficiency increases more slowly. In view of cost considerations, eight steps can be used.

Of course, the first lens array and the second lens array may also be one of a convex lens and a diffractive lens, respectively, and the disclosure is not limited thereto.

In addition, in order to facilitate packaging and fixing, in this embodiment, the bonding surface of the first lens array and the light shielding element is planar, and the bonding surface of the second lens array and the light shielding element is planar, such a design can also reduce the size of the optical device.

Optionally, in order to enable the user to more accurately adapt the diffractive lens according to the required refractive index, in another optional embodiment, radii of annulus corresponding to the steps of each phase grating are $r_{j,1}$ and $r_{j,2}$, respectively, wherein $$r_{j,1} = \left[\left(f' + \frac{(2j-1)\lambda/2}{n_1}\right)^2 - f'^2\right]^{1/2} = \sqrt{\frac{(2j-1)f'\lambda}{n_1}}\left(1 - \frac{(2j-1)\lambda}{4n_1 f'}\right)^{1/2},$$

$$r_{j,2} = \left[\left(f' + \frac{j\lambda}{n_1}\right)^2 - f'^2\right]^{1/2} = \sqrt{\frac{2jf'\lambda}{n_1}}\left(1 - \frac{j\lambda}{2n_1 f'}\right)^{1/2},$$

where f' represents a focal length value of the first lens array or the second lens array, and j represents a serial number of the phase grating.

As shown in FIG. 6, for a two-steps diffractive lens, the widths of the two steps are: $d_{j,1} = r_{j,1} - r_{j-1,2}$ and $d_{j,2} = r_{j,2} - r_{j,1}$, respectively.

For N-steps diffractive lenses, each phase grating has N−1 steps of the same width. In each phase grating, the width of the step closest to the center of the lens is different from the width of the above N−1 steps. In the j-th phase grating, the width of consecutive N−1 steps is:

$$t_{j,2} = \frac{d_{j,2}}{N/2}.$$

The width of the remaining step in the j-th phase grating is:

$$t_{j,1} = d_{j,1} - \sum_{i=1}^{m-1} \frac{d_{j,2}}{2^i}.$$

Further, the focal length values of the first lens array and the second lens array in this embodiment may be the same. However, in order to reduce the photosensitive area of the photosensitive element, the focal length value of the first lens array may be smaller than the focal length value of the second lens array.

Further, a center of the first lens, a center of the corresponding second lens, and a center of the corresponding light-transmitting aperture are coaxial. Thus, the incident main light and the exit main light have a low occlusion rate, which increases the light intensity and improves the accuracy of fingerprint identification.

Figure 3:
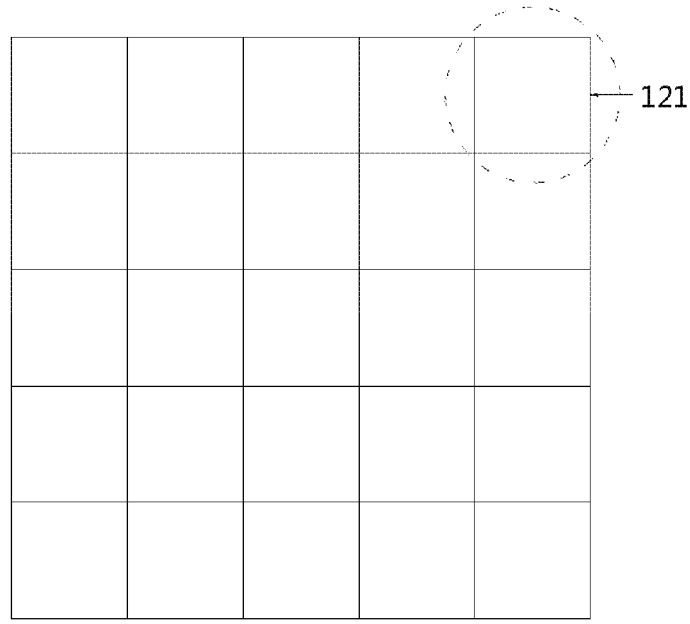
FIG. 3 is a schematic view showing a lens shape of a first lens array according to an embodiment of the present disclosure.
Figure 4:
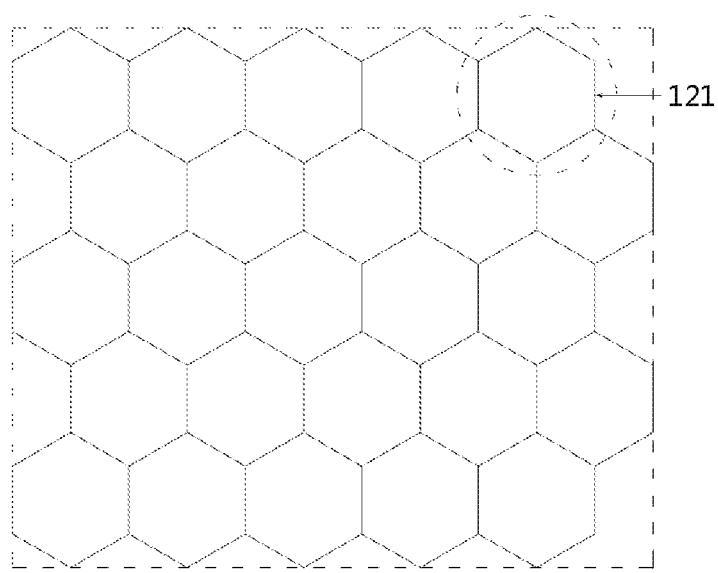
FIG. 4 is a schematic view showing a lens shape of a first lens array according to another embodiment of the present disclosure.

Further, in order to obtain a complete field of view, as shown in FIG. 3 and FIG. 4, a shape of the second lens 121 is a square or a regular hexagon; a shape of the first lens is a circle or a square, and an aperture of the first lens is smaller than an aperture of the second lens.

Each lens of the second lens array has a shape of square or regular hexagon, and each lens is seamlessly arranged; each lens of the first lens array has a circular or square shape, and the aperture of lens of the first lens array is smaller than the aperture of lens of the second lens array. Such a design can obtain complete fingerprint information without missing the valley lines and ridge lines of some fingerprints, which is beneficial to improve the identification accuracy.

Optionally, the optical device further includes a first substrate 21, a second substrate 22, and an OCA optical adhesive layer 4; wherein the first lens array 11 is integrally formed with the first substrate 21; the second lens array 12 is integrally formed with the second substrate 22; the light shielding element 3 and the OCA optical adhesive layer 4 are between the first substrate 21 and the second substrate 22.

The first substrate 21 and the second substrate 22 may serve as supporting members such that the positions of the first lens array 11, the light shielding element 3, and the second lens array 12 are relatively fixed. Also, the relative position of the light shielding element 3 can be adjusted by adjusting the thicknesses of the first substrate 21 and the second substrate 22.

Of course, the photoresist may be applied to the first lens array or the second lens array to form a light shielding element. It is also possible to attach a diaphragm array to one of the lens arrays to form a light shielding element. When the light shielding element 3 is formed on one of the lens arrays, the other lens array and the light shielding element 3 can be bonded by the OCA adhesive layer 4. The thickness of the OCA adhesive layer can be, for example, 150 um.

Another embodiment of the present disclosure provides a method for fabricating the optical device described above. The method includes: providing a first lens array, the first lens array including a plurality of first lenses; providing a second lens array opposite to the first lens array, the second lens array including a plurality of second lenses; and disposing a light shielding element between the first lens array and the second lens array, the light shielding element including a plurality of light-transmitting apertures. Image focal planes of the plurality of second lenses, object focal planes of the plurality of first lenses, and the light shielding element are coplanar; and the plurality of first lenses are in one-to-one correspondence with the plurality of second lenses and the plurality of light-transmitting apertures, respectively.

Figure 7:
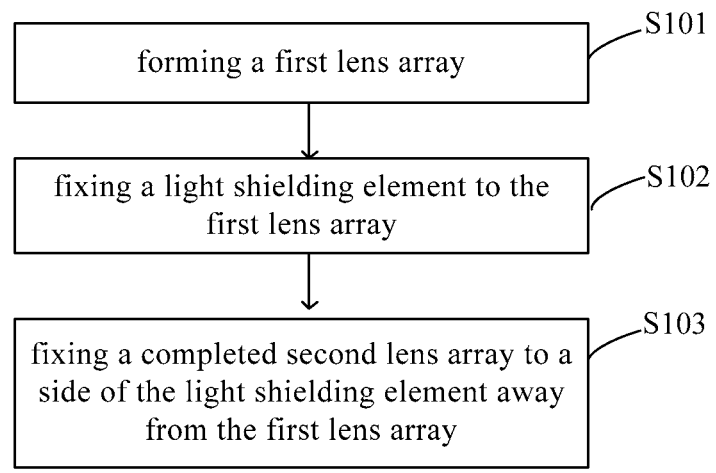
FIG. 7 is a flow chart of a method for fabricating an optical device according to an embodiment of the present disclosure.

Specifically, as shown in FIG. 7, the method may include the following steps.

S101: forming a first lens array. For example, an array of first lens array blocks can be formed by an injection molding process and then cut to a specific desired size by a cutting process.

S102: fixing a light shielding element to the first lens array. Specifically, the light shielding element may be formed of photoresist by a photoresist coating process. Of course, the light shielding element can also be a diaphragm, which can also be combined with the first lens array by the OCA adhesive layer.

S103: fixing a completed second lens array to a side of the light shielding element away from the first lens array. For example, an array of second lens array blocks can be formed by an injection molding process and then cut to a specific desired size by a cutting process. The fabricated second lens array is bonded to the other side of the light shielding element by the OCA adhesive layer.

The embodiments of the present disclosure provide a method for fabricating an optical device for fingerprint identification, by which the optical device described in the above embodiments can be fabricated. Moreover, the fabricating method of the present disclosure has the advantages of simple process and low cost, and the obtained optical device has good packaging property and high integration.

In an optional embodiment, the plurality of first lenses and the plurality of second lenses are convex lenses.

In an optional embodiment, the first lens or the second lens includes M annular phase gratings, M is a natural number; and each phase grating includes N steps, a height of a step is:

$$h = \frac{\lambda/N}{n_1 - n_2},$$

where λ is a wavelength of incident light, $n_1$ is a refractive index of a material of the step, $n_2$ is a refractive index of a dielectric on a side of the step away from the light shielding element, and N is an even number.

In an optional embodiment, radii of annulus corresponding to the steps of each phase grating are $r_{j,1}$ and $r_{j,2}$, respectively, wherein $$r_{j,1} = \left[\left(f' + \frac{(2j-1)\lambda/2}{n_1}\right)^2 - f'^2\right]^{1/2} = \sqrt{\frac{(2j-1)f'\lambda}{n_1}\left(1 - \frac{(2j-1)\lambda}{4n_1 f'}\right)^{1/2}},$$

$$r_{j,2} = \left[\left(f' + \frac{j\lambda}{n_1}\right)^2 - f'^2\right]^{1/2} = \sqrt{\frac{2jf'\lambda}{n_1}\left(1 - \frac{j\lambda}{2n_1 f'}\right)^{1/2}},$$

where f' represents a focal length value of the first lens array or the second lens array, and j represents a serial number of the phase grating.

In an optional embodiment, the step of disposing a light shielding element between the first lens array and the second lens array includes: disposing the light shielding element between a first substrate and a second substrate, and bonding the first substrate and the second substrate using an OCA optical adhesive layer.

Figure 8:
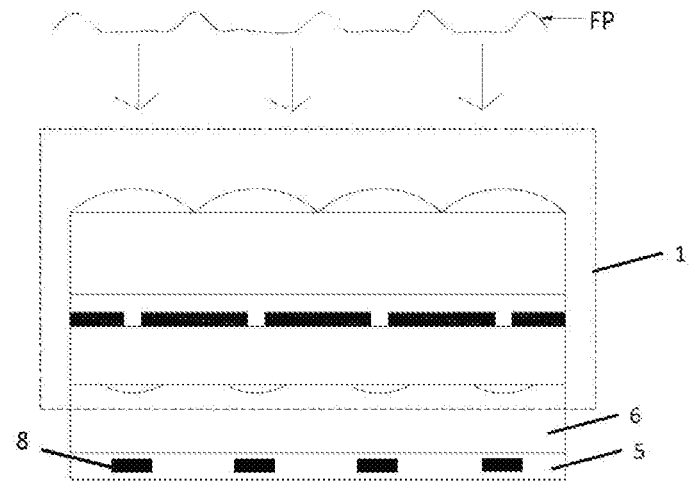
FIG. 8 is a schematic structural view of a fingerprint identification panel according to an embodiment of the present disclosure.

Further, an embodiment of a further aspect of the disclosure provides a fingerprint identification module. As shown in FIG. 8, the fingerprint identification module includes: the optical device 1 according to any one of the above embodiments; and a photosensitive element array on a side of the first lens array away from the light shielding element. The photosensitive element array includes a plurality of photosensitive elements 8; the plurality of photosensitive elements 8 and the plurality of first lenses are in one-to-one correspondence.

When the fingerprint is close to the optical device, the fingerprint reflects light emitted by the light source, the light passes through the second lens array, the light shielding element, and the first lens array to reach the photosensitive element; the photosensitive element receives the light to generate an electrical signal, and the electrical signal is used to determine fingerprint information. In the fingerprint identification module, the optical device described above is incorporated. Since the light shielding element is on the plane where the focuses of the first lens array and the second lens array are located, the incident main light and the exit main light are parallel to the optical axis. The object distance and image distance of the optical device can be adjusted without affecting its accuracy. Therefore, in the manufacturing process of the photosensitive element, it is not necessary to dispose it on the plane where the focuses of the lenses are located, and the fingerprint information can be clearly recognized. As a result, the requirements for fabrication process are reduced and can be set according to actual needs.

Although in the present embodiment, the plurality of photosensitive elements 8 are formed on a substrate 5, the present disclosure is not limited thereto. In addition, the lenses in the lens array shown in the figures are convex lenses, but it is merely exemplary. In this embodiment, the lens in the lens array may also be a diffractive lens to reduce the thickness of the module.

The light-transmitting aperture enables the imaging beams of the first lens array and the second lens array to be imaged in a paraxial narrow beams on the photosensitive surface of the photosensitive element, minimizing the generation of aberrations, enabling the photosensitive element to acquire a sharper fingerprint image, and improving the imaging quality of the module.

The photosensitive element may be a CCD (charge coupled device) sensor, a CMOS (complementary metal-oxide semiconductor) sensor, or even a photodiode, and the disclosure is not limited thereto.

In some optional embodiments, the module further includes a sensing circuit for reading the electrical signal and controlling an output of the read electrical signal.

Optionally, as shown in FIG. 8, the module further includes: a transparent layer 6 between the first lens array and the photosensitive element array. The transparent layer 6 can be used to support the optical device. The transparent layer 6 can be made of a hard material such as PMMA (polymethyl methacrylate) or PC (polycarbonate), or can be made of a soft material such as PET (polyethylene terephthalate) or COP, etc., as long as the transparency of the transparent layer 6 can be ensured and it can be flattened when it is bonded to the optical device. The refractive index of the transparent layer 6 can be selected from 1.2 to 1.4.

The substrate and the first lens array can be attached in a frame-to-frame or face-to-face manner.

It should be understood by those skilled in the art that when the photosensitive element is on a plane where the focus of the first lens array at a side close to the substrate is located, the acquired fingerprint information is the clearest and the identification degree is the highest.

The photosensitive element may be disposed on either side of the substrate, and the photosensitive element may be disposed on a side close to the optical device to improve the overall transmittance of light and realize high definition fingerprint identification.

Light of the fingerprint identification module may be provided by a point light source or may be provided by a parallel light source. The positions of the optical device and the substrate may be adaptively adjusted according to different light sources, and the disclosure is not limited thereto.

Figure 9:
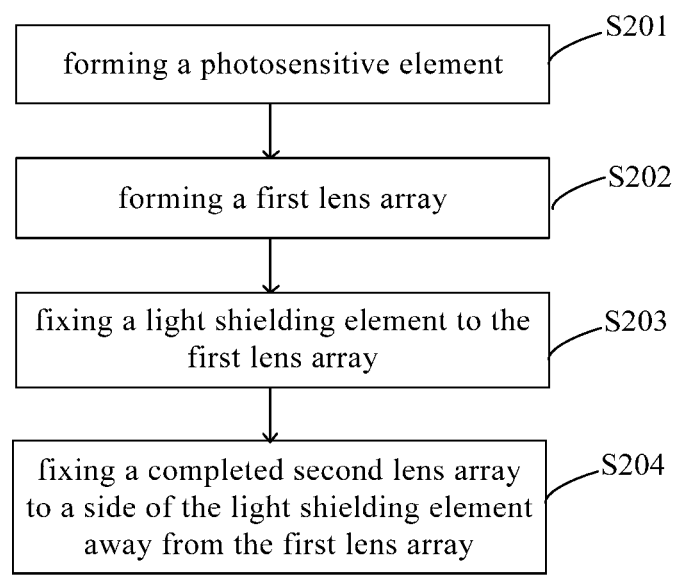
FIG. 9 is a flow chart of a method for fabricating a fingerprint identification panel according to an embodiment of the present disclosure.

Further, further embodiments of the present disclosure provide a method for fabricating the fingerprint identification module. As shown in FIG. 9, the method can include the following steps.

S201: forming a photosensitive element. The photosensitive element may be disposed on either side of the substrate, and the photosensitive element may be disposed on a side close to the optical device to improve the overall transmittance of light and realize high definition fingerprint identification. Of course, the photosensitive element can also be formed and fixed in other manners.

S202: forming a first lens array. For example, an array of first lens array blocks can be formed by an injection molding process and then cut to a specific desired size by a cutting process.

S203: fixing a light shielding element to the first lens array. Specifically, the light shielding element may be formed of photoresist by a photoresist coating process. Of course, when the light shielding element is a diaphragm, it can also be combined with the first lens array by the OCA adhesive layer.

S204: fixing the completed second lens array to a side of the light shielding element away from the first lens array. For example, an array of second lens array blocks can be formed by an injection molding process and then cut to a specific desired size by a cutting process. The fabricated second lens array is bonded to the other side of the light shielding element by the OCA adhesive layer.

The fabricating method provided by the embodiment has the advantages of simple process and low cost, and the fabricated fingerprint identification module has good packaging property and high integration.

Figure 10:
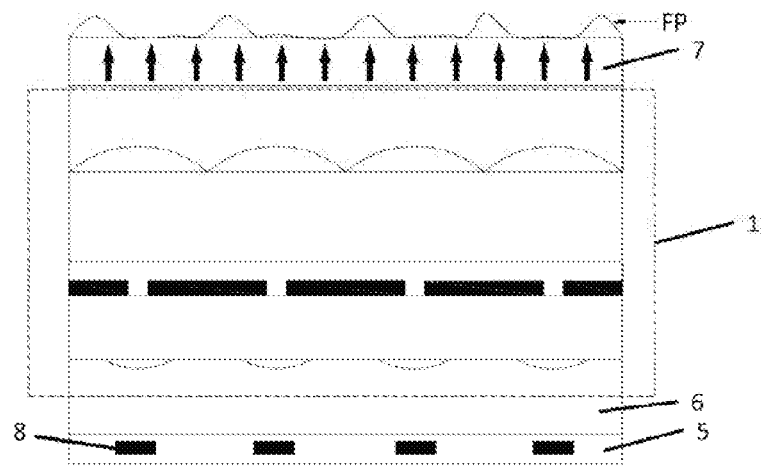
FIG. 10 is a schematic structural view of an apparatus according to an embodiment of the present disclosure.

A further aspect of the present disclosure provides a module for fingerprint identification. As shown in FIG. 10, the module includes: the optical device according to any one of the above embodiments; and a light source having a light emitting direction (shown by an arrow in FIG. 10) that is the same as a direction of the first lens array to the second lens array. The light source is configured to illuminate a fingerprint (indicated by FP in FIG. 10); light from the light source is reflected by the fingerprint and sequentially passes through the second lens array, the light shielding element, and the first lens array to reach the photosensitive element, the photosensitive element receives the light to generate an electrical signal, and the electrical signal is used to determine the information of the fingerprint.

Optionally, the light source is an OLED panel; and the OLED panel is at a side of the second lens array away from the light shielding element. The OLED panel can cover the optical device.

The OLED (organic light-emitting diode) panel may include: a cover glass, an insulating layer on a side of the cover glass, a source/drain, an active region, a cathode, an anode, a light-emitting layer, etc., and the OLED panel of the present disclosure may be an OLED display panel known to those skilled in the art, the present disclosure is not limited thereto.

In this aspect, the module incorporates the optical device described above. Therefore, on the one hand, the module can be directly packaged with a substrate with a photosensitive element or the like for easy installation; on the other hand, while the module is used as a display panel, light emitted from the organic light-emitting layer of the OLED can also be used, the light containing fingerprint information is reflected below the display module, thereby realizing the function of the under-screen fingerprint without affecting the display function of the screen.

Further, the OLED panel and the optical device are attached in a frame-to-frame or face-to-face manner.

Moreover, a further aspect of the present disclosure provides an apparatus for fingerprint identification that can implement the function of under-screen fingerprint identification. As shown in FIG. 10, the apparatus includes: the optical device 1 according to any one of the above embodiments; a light source having a light emitting direction (shown by an arrow in FIG. 10) that is the same as a direction of the first lens array to the second lens array; and a photosensitive element array on a side of the first lens array away from the light shielding element. The photosensitive element array includes a plurality of photosensitive elements; the plurality of photosensitive elements and the plurality of first lenses are in one-to-one correspondence. The light source can be an OLED panel. The light emitted by the OLED panel is reflected by the fingerprint and sequentially passes through the OLED panel 7, the second lens array, the light shielding element, and the first lens array to reach the photosensitive element. The photosensitive element 8 receives the light reflected by the fingerprint to generate an electrical signal, and the electrical signal is used to determine the information of the fingerprint.

The apparatus provided in this respect incorporates the above OLED panel and the fingerprint identification panel to realize the function of the under-screen fingerprint, the screen space is thus not occupied and is beneficial to cooperate with the full-screen technology. Further, the optical device makes the thickness of the OLED panel and the distance between the substrate and the optical device not limited, and can be designed or modified according to actual needs, which facilitates fabrication and does not affect the resolution and accuracy of fingerprint collection.

Of course, similarly, the apparatus of the present embodiment may further include a transparent layer 6, and the photosensitive elements may be on a side of the substrate close to the optical device 1 to improve the overall transmittance of light.

This embodiment utilizes an OLED to provide light. Compared with a point light source, since the light intensity incident on the fingerprint is uniform, it is easier to compare and detect, and the identification degree is higher.

Further, a further aspect of the present disclosure provides a method for fabricating the above apparatus. Compared with the method for fabricating the fingerprint identification module, the method of this embodiment adds the step of OLED packaging (for example, bonding the OLED panel to the fingerprint identification panel by gluing).

The OLED panel may be an OLED display panel known to those skilled in the art, and the disclosure is not limited thereto.

Figure 11:
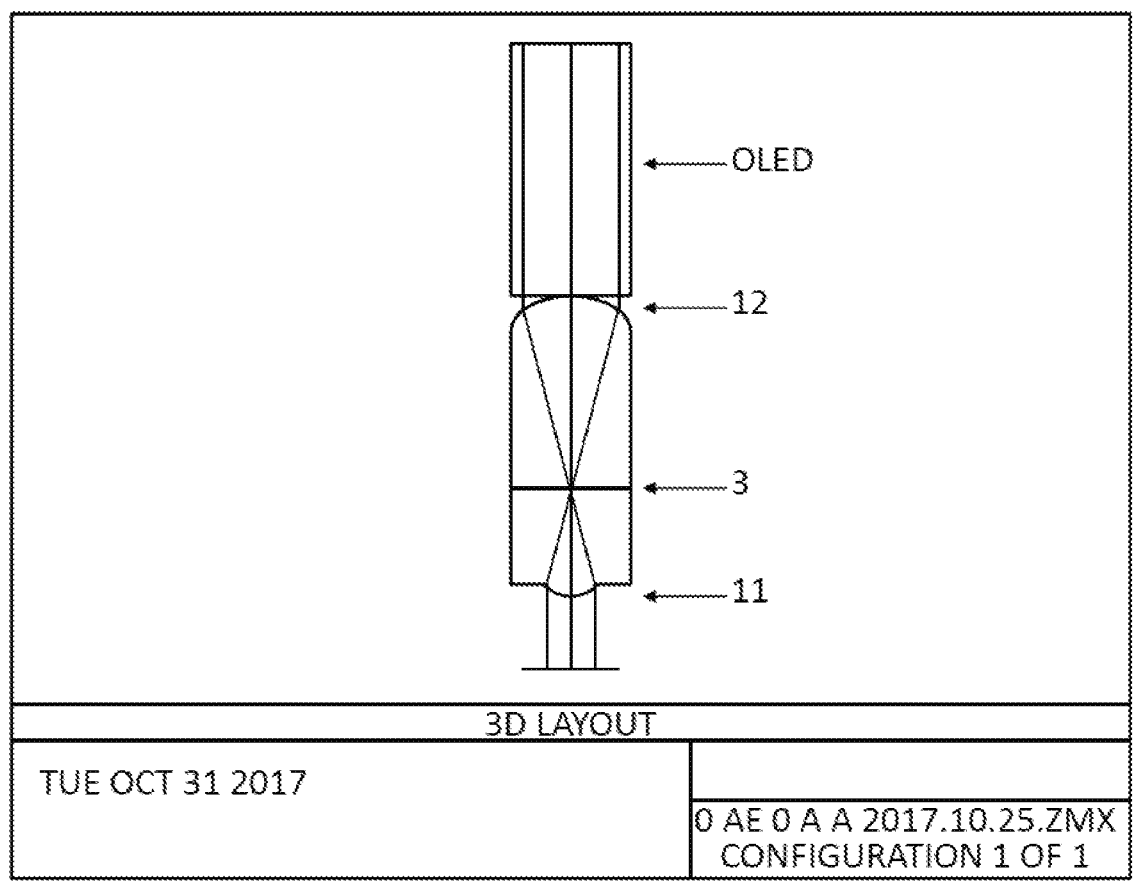
FIG. 11 is a schematic view showing an optical path simulation of an apparatus according to an embodiment of the present disclosure.
Figure 12:
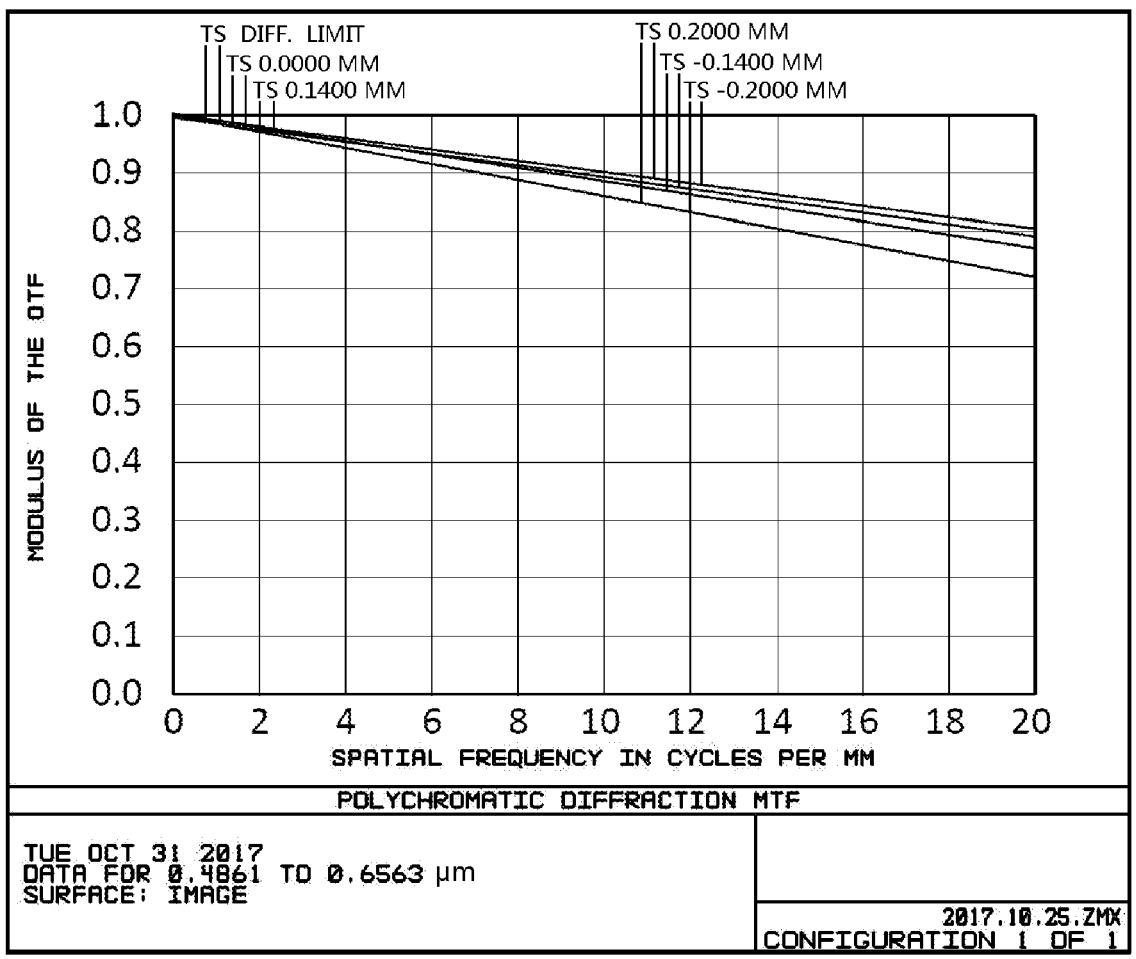
FIG. 12 is a schematic view showing the modulation transfer function curve (MTF) of FIG. 11.

The size of the apparatus can be designed as needed. For example, in a specific embodiment, the photosensitive element is a CMOS imaging sensor and the photosensitive element is formed on a substrate, the light shielding element is a diaphragm array, and the apparatus emits light by an OLED. In this embodiment, the thickness of the OLED $t1=930$ um, the refractive index of the OLED $n3=1.5164$, the refractive index of the first lens array and the second lens array $n1=1.491$, the refractive index of the dielectric on the first lens array surface and the second lens array surface $n2=1$. The above optical imaging unit is optimized by zemax optical design software, and the interface diagram of the optical path simulation for the imaging unit is shown in FIG. 11. The interface diagram of the modulation transfer function curve (MTF) is shown in FIG. 12. The MTF curve in FIG. 12 shows the decrease in contrast (the difference between the valley and ridge light intensity divided by the sum of the valley and ridge light intensity) after the fingerprint is transmitted through the optical system. The ordinate in FIG. 12 is the MTF value, the larger the value, the higher the valley-ridge contrast of the imaging fingerprint. The abscissa in FIG. 12 is the characteristic frequency satisfying the Nyquist sampling theorem, and the characteristic frequency is N. When the imaging sensor is a 500 PPI sensor, the pixel size $\Delta=50.8$ μm, $N=10$ (lp/mm); when the imaging sensor is a 1000 PPI sensor, the pixel size $\Delta=25.4$ μm, $N=20$ (lp/mm) As can be seen from FIG. 12, the contrast of the imaging fingerprint still maintains an efficient transfer at 20 lp/mm, meeting the imaging requirements of 1000 PPI.

Figure 13:
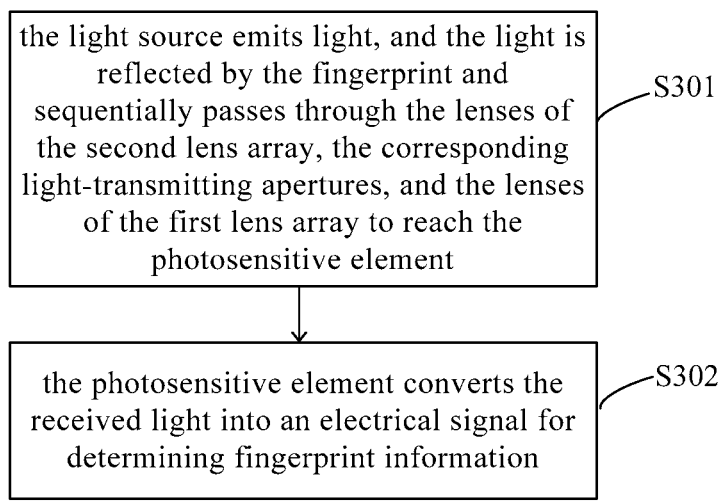
FIG. 13 is a flow chart of a fingerprint identification method according to an embodiment of the present disclosure.

In conjunction with the above embodiments, a further aspect of the present disclosure provides a fingerprint identification method that utilizes the apparatus in the above embodiments. As shown in FIG. 13, the method may specifically include the following steps.

S301: the light source emits light, and the light is reflected by the fingerprint and sequentially passes through the lenses of the second lens array, the corresponding light-transmitting apertures, and the lenses of the first lens array to reach the photosensitive element. As can be seen from FIG. 11, the light reflected by the fingerprint (incident light) and the light entering the photosensitive element (exit light) are parallel light. Therefore, flexible adjustment of the thickness of the OLED panel and the distance from the substrate to the optical device can be achieved, and the resolution and accuracy of collected fingerprint information are not affected.

S302: the photosensitive element converts the received light into an electrical signal for determining fingerprint information. The electrical signal is determined by the type of the photosensitive element. For example, if the photosensitive element is an LED photosensitive element, the output electrical signal is a reverse current. The photosensitive element can also be a CCD and a CMOS. When the finger touches the upper surface of the OLED glass cover, the finger fingerprint can be imaged on the photosensitive element, through the image stitching technology, a complete fingerprint image can be formed, and the fingerprint identification function can be realized.

Further, the photosensitive elements are a plurality of photosensitive elements arranged in an array. The method may further include: splicing a plurality of image fragments including image information transformed according to the electrical signal into a complete image. This step can be done by a computer.

By utilizing the above apparatus, the full-screen fingerprint identification method provided by the present disclosure can perform fingerprint identification at a display area in a terminal such as a full-screen mobile phone without occupying an extra area of the display screen.

Further, a further aspect of the present disclosure provides a terminal or system including the above apparatus. For example, the display terminal is any device having an OLED display function, such as a mobile phone or a tablet computer.

The system includes the above fingerprint identification apparatus, and a processing unit, a determining unit, a memory unit, and the like configured according to a scenario.

For example, in an access control system, the fingerprint identification system includes a fingerprint identification apparatus, a determining unit and a memory unit. The fingerprint identification panel is configured to identify the fingerprint information, and the determining unit compares the identified fingerprint information with the user fingerprint information stored by the memory unit. If user fingerprint information matching the identified fingerprint information can be retrieved from the memory unit, the comparison is successful and the access control is opened.

In the access control system, the determining unit and the memory unit can be disposed in the cloud server. A fingerprint identification panel and a wireless communication unit are disposed on the access control. The wireless communication unit is configured to establish wireless communication between the fingerprint identification panel and the cloud server.

In another specific embodiment, the fingerprint identification system is a mobile phone. The mobile phone may include a display screen, a fingerprint identification panel, a processing unit (e.g., a processor of the mobile phone), and a memory unit (e.g., a memory in the mobile phone). By means of the calculation function of the processor and the data storage function of the memory, it is determined whether the user is the owner by comparing the fingerprint previously entered by the owner with the currently collected fingerprint information. If the fingerprint information is not the fingerprint information of the owner, the lock screen state is maintained. If the wrong fingerprint information is frequently input, it is judged that the mobile phone is in an abnormal state, and operations such as shutdown, sending position, and locking are taken.

The identification system can utilize the processing power of its cloud server or the apparatus that applies the identification panel. It is only necessary to transfer the acquired image information to a server or apparatus. The server or apparatus analyzes and processes, and even uses deep learning, image segmentation and other technologies to identify the object. The identification system can be used in a housing estate or company access control system, or in any scenario where identity recognition, fingerprint identification, etc. are required.

The terms "first", "second", etc. in the description, the claims and the drawings of the present disclosure are used to distinguish different objects, and are not intended to describe a specific order. Furthermore, the terms "comprises", "includes" and any variants thereof are intended to cover a non-exclusive inclusion. For example, a process, method, system, product, or device that comprises a series of steps or units is not limited to the listed steps or units, but optionally also includes steps or units not listed, or optionally also includes other steps or units inherent to the process, method or device.

The above embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:

1. An optical device for fingerprint identification, comprising:
a first lens array comprising a plurality of first lenses;
a second lens array opposite to the first lens array, comprising a plurality of second lenses; and
a light shielding element between the first lens array and the second lens array, the light shielding element comprising a plurality of light-transmitting apertures,
wherein image focal planes of the plurality of second lenses, object focal planes of the plurality of first lenses, and the light shielding element are coplanar,
wherein the plurality of first lenses are in one-to-one correspondence with the plurality of second lenses and the plurality of light-transmitting apertures, respectively, and
wherein each first lens of the plurality of first lenses or each second lens of the plurality of second lenses comprises M annular phase gratings, wherein M is a natural number; and
each phase grating of the M annular phase gratings comprises N steps, and a height of a step of the N steps is:

$$h = \frac{\lambda/N}{n_1 - n_2},$$

wherein $\lambda$ is a wavelength of incident light, $n_1$ is a refractive index of a material of the step, $n_2$ is a refractive index of a dielectric on a side of the step away from the light shielding element, and N is an even number.

2. The optical device according to claim 1, wherein radii of annulus corresponding to the N steps of each phase grating of the M annular phase gratings are $r_{j,1}$ and $r_{j,2}$, respectively, wherein $$r_{j,1} = \left[\left(f' + \frac{(2j-1)\lambda/2}{n_1}\right)^2 - f'^2\right]^{1/2} = \sqrt{\frac{(2j-1)f'\lambda}{n_1}}\left(1 - \frac{(2j-1)\lambda}{4n_1 f'}\right)^{1/2},$$

$$r_{j,2} = \left[\left(f' + \frac{j\lambda}{n_1}\right)^2 - f'^2\right]^{1/2} = \sqrt{\frac{2jf'\lambda}{n_1}}\left(1 - \frac{j\lambda}{2n_1 f'}\right)^{1/2},$$

wherein f' represents a focal length value of the first lens array or the second lens array, and j represents a number of the phase grating.

3. The optical device according to claim 1, wherein a center of each first lens of the plurality of first lenses, a center of a corresponding second lens of the plurality of second lenses, and a center of a corresponding light-transmitting aperture of the plurality of light-transmitting apertures are coaxial.

4. The optical device according to claim 1, wherein a shape of each second lens of the plurality of second lenses comprises a square or a regular hexagon; a shape of each first lens of the plurality of first lenses comprises a circle or a square, and an aperture of the each first lens is smaller than an aperture of the each second lens.

5. The optical device according to claim 1, further comprising:
a first substrate;
a second substrate; and
an OCA optical adhesive layer,
wherein the first lens array is integrally formed with the first substrate,
wherein the second lens array is integrally formed with the second substrate, and
wherein the light shielding element and the OCA optical adhesive layer are between the first substrate and the second substrate.

6. A module for the fingerprint identification, comprising:
the optical device according to claim 1; and
a photosensitive element array on a side of the first lens array away from the light shielding element, the photosensitive element array comprising a plurality of photosensitive elements, the plurality of photosensitive elements and the plurality of first lenses being in one-to-one correspondence.

7. The module according to claim 6, further comprising:
a transparent layer between the first lens array and the photosensitive element array.

8. A module for the fingerprint identification, comprising:
the optical device according to claim 1; and
a light source having a light emitting direction that is a same as a direction from the first lens array to the second lens array.

9. The module according to claim 8, wherein the light source comprises an OLED panel, and the OLED panel is on a side of the second lens array away from the light shielding element.

10. The module according to claim 9, wherein the OLED panel and the optical device are attached in a frame-to-frame or face-to-face manner.

11. An apparatus for the fingerprint identification, comprising:
the optical device according to claim 1;
a light source having a light emitting direction that is a same as a direction from the first lens array to the second lens array; and
a photosensitive element array on a side of the first lens array away from the light shielding element, the photosensitive element array comprising a plurality of photosensitive elements, the plurality of photosensitive elements and the plurality of first lenses being in one-to-one correspondence.

12. The apparatus according to claim 11, wherein the light source comprises an OLED panel, and the OLED panel is on a side of the second lens array away from the light shielding element.

13. A fingerprint identification system comprising the apparatus according to claim 11.

14. A method for fabricating an optical device, the method comprising:
providing a first lens array, the first lens array comprising a plurality of first lenses;
providing a second lens array opposite to the first lens array, the second lens array comprising a plurality of second lenses; and
disposing a light shielding element between the first lens array and the second lens array, the light shielding element comprising a plurality of light-transmitting apertures,
wherein image focal planes of the plurality of second lenses, object focal planes of the plurality of first lenses, and the light shielding element are coplanar,
wherein the plurality of first lenses are in one-to-one correspondence with the plurality of second lenses and the plurality of light-transmitting apertures, respectively, and
each first lens of the plurality of first lenses or each second lens of the plurality of second lenses comprises M annular phase gratings, wherein M is a natural number; and
wherein each phase grating of the M annular phase gratings comprises N steps, and a height of a step of the N steps is:

$$h = \frac{\lambda/N}{n_1 - n_2},$$

wherein $\lambda$ is a wavelength of incident light, $n_1$ is a refractive index of a material of the step, $n_2$ is a refractive index of a dielectric on a side of the step away from the light shielding element, and N is an even number.

15. The method according to claim 14, wherein radii of annulus corresponding to the N steps of each phase grating of the M annular phase gratings are $r_{j,1}$ and $r_{j,2}$, respectively, wherein $$r_{j,1} = \left[\left(f' + \frac{(2j-1)\lambda/2}{n_1}\right)^2 - f'^2\right]^{1/2} = \sqrt{\frac{(2j-1)f'\lambda}{n_1}}\left(1 - \frac{(2j-1)\lambda}{4n_1 f'}\right)^{1/2},$$

$$r_{j,2} = \left[\left(f' + \frac{j\lambda}{n_1}\right)^2 - f'^2\right]^{1/2} = \sqrt{\frac{2jf'\lambda}{n_1}}\left(1 - \frac{j\lambda}{2n_1 f'}\right)^{1/2},$$

wherein f' represents a focal length value of the first lens array or the second lens array, and j represents a number of the phase grating.

16. The method according to claim 14, wherein disposing the light shielding element between the first lens array and the second lens array comprises:
- disposing the light shielding element between a first substrate and a second substrate;
- bonding the first substrate and the second substrate using an OCA optical adhesive layer.

17. An optical device for fingerprint identification, comprising:
- a first lens array comprising a plurality of first lenses;
- a second lens array opposite to the first lens array, comprising a plurality of second lenses; and
- a light shielding element between the first lens array and the second lens array, the light shielding element comprising a plurality of light-transmitting apertures,
- wherein image focal planes of the plurality of second lenses, object focal planes of the plurality of first lenses, and the light shielding element are coplanar,
- wherein the plurality of first lenses are in one-to-one correspondence with the plurality of second lenses and the plurality of light-transmitting apertures, respectively, and
- wherein a shape of each second lens of the plurality of second lenses comprises a square or a regular hexagon; a shape of each first lens of the plurality of first lenses comprises a circle or a square, and an aperture of the each first lens is smaller than an aperture of the each second lens.

* * * * *